M. BICHEROUX.
APPARATUS FOR THE MANUFACTURE OF RAW PLATE GLASS.
APPLICATION FILED JAN. 20, 1914.
1,101,392. Patented June 23, 1914.
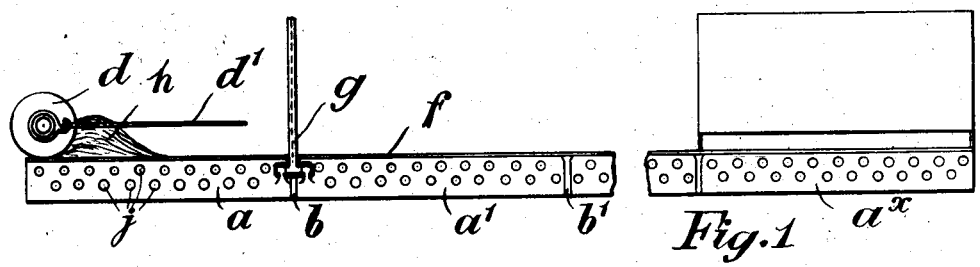
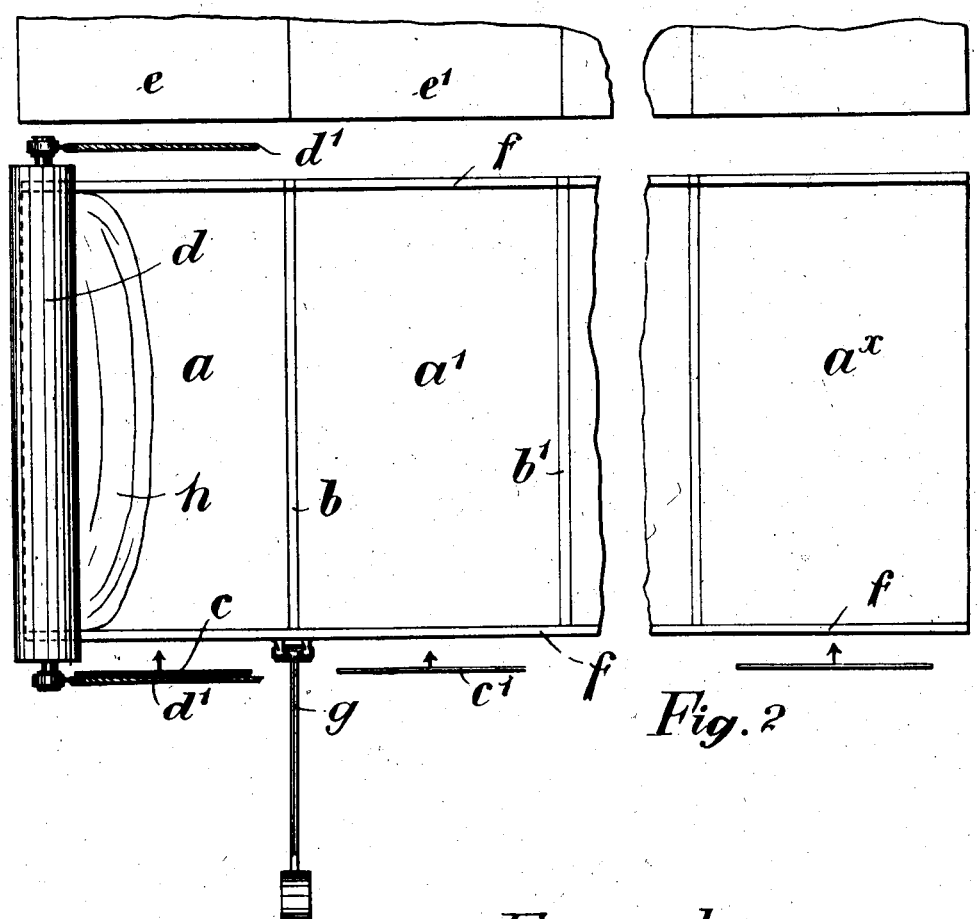

UNITED STATES PATENT OFFICE.

MAX BICHEROUX, OF HERZOGENRATH, GERMANY, ASSIGNOR TO BICHEROUX, LAMBOTTE AND CIE., GESELLSCHAFT MIT BESCHRANKTER HAFTUNG, OF HERZOGENRATH, GERMANY.

APPARATUS FOR THE MANUFACTURE OF RAW PLATE-GLASS.

1,101,392.  Specification of Letters Patent.  Patented June 23, 1914.

Application filed January 20, 1914. Serial No. 813,189.

*To all whom it may concern:*

Be it known that I, MAX BICHEROUX, formerly a subject of the King of Belgium, now a citizen of the German Empire, residing at Herzogenrath, Rheinland, Germany, have invented certain new and useful Improvements in Apparatus for the Manufacture of Raw Plate-Glass, of which the following is a specification.

This invention relates to improved apparatus for the manufacture of raw plate glass and is as to its main features a division from my application Serial No. 568,260 filed 22nd June, 1910, although certain details not shown in that application are herein fully set forth. The raw plate glass treated by this improved apparatus is of that high quality which is subsequently ground into clear plate glass suitable for making mirrors and the like. The apparatus is also suitable for making what is known at present as thin plate glass, that is to say glass about 5 mm. thick or less.

The improved apparatus will be more readily understood from the following description made with reference to the accompanying drawings and the novelty of the invention will be pointed out in the appended claims.

In the drawings:—Figure 1 is a diagrammatic side view of the apparatus according to the present invention. Fig. 2 is a diagrammatic plan, and Fig. 3 is a section through the adjacent ends of two table sections.

In carrying the invention into effect according to the form shown, the pouring table is composed of a plurality of sections $a$, $a'$, $a^x$, which are fixed or stationary and their upper surfaces are plain and flat. Over the table there is arranged a roller $d$, which is adapted to traverse from end to end of the table over the sections in series. Suitable means for this purpose are ropes or like members $d'$ on each side of the roller $d$. In its travel over the separate sections of the table the roller $d$ is held in spaced relation to the table. This may conveniently be effected by means of removable side ledges $f$ arranged along each of the longitudinal edges of the table. The separate sections are spaced apart and these spaces are normally filled by bars $b$, which may conveniently have beveled sides at their upper ends as shown in Fig. 3. These beveled sides fit into chamfered edges on the adjacent ends of neighboring table sections. This allows the separate sections of the tables to expand independently and materially assists in preserving a plain surface on the tables and prevents buckling or any wavy formation of the upper surface which is liable to occur owing to the successive intense heat and cooling to which the table is subjected. Annealing ovens $e$, $e'$, are arranged along one of the longitudinal sides of the table in close proximity thereto. At the other side of the table there are arranged pushing means $c$, $c'$, which are adapted to operate in the direction of the arrows indicated. The roller $d$ commences its operative traverse from the left hand end in Fig. 1 and at a point suitably spaced from this end where the first table section $a$ terminates, cutting apparatus $g$ is arranged. This cutting apparatus is conveniently of the type described in my co-pending applications, Serial Nos. 711,439 filed July 25, 1912 or 795,303 filed Oct. 15, 1913.

The operation of this device is as follows:—The roller $d$ is at the left hand end of the table from which it starts its operative traverse from left to right. A heap of molten glass is spread on the first table section $a$ in front of the roller $d$. The roller $d$ is then pulled from left to right by means of the rope or the like $d'$. In this way a coherent plate is spread over the table sections from the molten mass of glass $h$. As the roller $d$ passes over the junction between two table sections, say the sections $a$, $a'$, the glass still retains its coherent form, but immediately the roller has passed over, the bar $b$ is moved out of position and the cutting apparatus $g$ is operated to sever a sheet from the coherent plate. In the meantime the rolling operation still proceeds, that is to say, the action of pulling the roller $d$ over the table $a'$, etc., is simultaneous with the cutting by the transverse cutter $g$. While the rolling still continues the pushers $c$ are brought into operation to push the separate sheets in the direction of the arrows indicated over the table sections into the annealing furnaces $e$. This operation is effected as soon as possible after the roller $d$ passes the first junction $b$. The same remarks apply to the sheet served on the table $a'$ when the roller $d$ passes the junction $b'$. The table sections $a$, $e'$, etc., may be independently cooled by any suitable means such as by transverse passages indicated at $j$.

The advantages attendant upon the use of the apparatus described are that the separate table sections may be made in single pieces and appropriately cooled according to requirements. The evenness of the surface is thus readily maintained even in protracted use. The use of cutting apparatus which operates on the rolled sheet after the passage of the roller is preferably in the manufacture of the plate glass as it effectively prevents the formation of blemishes and it enables the separate sheets to be removed independently into the annealing chamber simultaneously with the rolling of the original mass $h$. This is a matter of considerable importance as the limitation of the length of the table is no longer the rate of cooling of the rolled glass plate, but merely the limitations associated with the heap $h$. These limitations are not so serious as those associated with the cooling of the plate and consequently by means of this invention much longer plates may be rolled and also much thinner plates. The rolling of these plates has been associated with difficulties owing to the rapid cooling of the thin plate.

I claim:—

1. Apparatus for manufacturing raw plate glass, comprising a flat table composed of a plurality of separate sections spaced apart, movable bars filling said spaces, a transverse roller adapted to traverse said sections in series and means for holding said roller in spaced relation to said table during its traverse.

2. Apparatus for producing rolled raw plate glass for mirror glass comprising a plurality of spaced separate table sections arranged behind each other and having chamfered edges and beveled bars located between said tables and having beveled sides that engage said chamfered edges.

3. In apparatus for manufacturing raw plate glass, the combination with a plane table consisting of slightly separated sections, of a cylindrical roller transverse to the table, parallel to and at a constant distance from the table's surface, means for moving the roller over the table, to roll to plate form a mass of plastic glass in its own front, and means mounted to operate between consecutive sections for separating near and in the rear of the roller the sheet so formed.

4. In apparatus of the class described, the combination with a plane table comprising slightly separated sections, of a removable bar substantially filling the space between said sections, a cylindrical roller arranged to move over the table parallel to and at a fixed distance from its surface, and means adapted to operate the plane of said bar for severing in the rear of the roller the forming sheet rolled thereby.

In testimony whereof I have signed my name to this specification in the presence of two subscribing witnesses.

MAX BICHEROUX.

Witnesses:
OTTO PREUSS,
ERNST LUTZ.